(12) United States Patent
Lee et al.

(10) Patent No.: US 7,822,328 B2
(45) Date of Patent: Oct. 26, 2010

(54) METHOD FOR CONTROLLING DIGITAL PHOTOGRAPHING APPARATUS AND DIGITAL PHOTOGRAPHING APPARATUS ADOPTING THE METHOD

(75) Inventors: Seung-bong Lee, Changwon-si (KR); Nyun-woo Nam, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 11/821,046

(22) Filed: Jun. 21, 2007

(65) Prior Publication Data

US 2007/0248348 A1  Oct. 25, 2007

(30) Foreign Application Priority Data

Jul. 3, 2006 (KR) ........... 10-2006-0061937
Nov. 3, 2006 (KR) ........... 10-2006-0108536

(51) Int. Cl.
*G03B 17/00* (2006.01)
(52) U.S. Cl. .......... 396/52; 396/55; 348/208.99; 348/208.5; 348/229.1; 348/363
(58) Field of Classification Search .......... 396/52, 396/54; 348/229.1
See application file for complete search history.

(56) References Cited

U.S. PATENT DOCUMENTS

| | | | | |
|---|---|---|---|---|
| 4,431,287 A * | 2/1984 | Sakai et al. | ........... | 396/238 |
| 7,242,426 B2 * | 7/2007 | Miyashita et al. | ........ | 348/229.1 |
| 7,440,011 B2 * | 10/2008 | Fleury et al. | ........... | 348/229.1 |
| 7,456,868 B2 * | 11/2008 | Calderwood | ........... | 348/229.1 |
| 7,495,701 B2 * | 2/2009 | Furukawa | ........... | 348/308 |
| 7,525,592 B2 * | 4/2009 | Kato | ........... | 348/370 |
| 2001/0004271 A1 * | 6/2001 | Konishi | ........... | 348/371 |
| 2004/0160525 A1 * | 8/2004 | Kingetsu et al. | ........... | 348/364 |
| 2004/0239775 A1 * | 12/2004 | Washisu | ........... | 348/239 |
| 2006/0257128 A1 * | 11/2006 | Ishito et al. | ........... | 396/55 |
| 2007/0212054 A1 * | 9/2007 | Kobayashi | ........... | 396/165 |
| 2007/0247536 A1 * | 10/2007 | Murakami | ........... | 348/302 |

* cited by examiner

*Primary Examiner*—Melissa J Koval
*Assistant Examiner*—Linda B Smith
(74) *Attorney, Agent, or Firm*—Drinker Biddle & Reath LLP

(57) ABSTRACT

A method for controlling a digital photographing apparatus and an apparatus adopting the method, which include obtaining first information of a subject at a time $t_1$ at a first sensitivity, obtaining second information of the subject at a time $t_2$ that is different from time $t_1$ at a second sensitivity, and obtaining an image of the subject using the first information and the second information, wherein at least one of the obtaining of the first information and the obtaining of the second information is performed in a state in which a position where an image of the subject is formed on a photographing element of the photographing apparatus is maintained constant despite shaking of the photographing apparatus.

28 Claims, 4 Drawing Sheets

METHOD FOR CONTROLLING DIGITAL PHOTOGRAPHING APPARATUS AND DIGITAL PHOTOGRAPHING APPARATUS ADOPTING THE METHOD

CROSS-REFERENCE TO RELATED PATENT APPLICATIONS

This application claims the benefit of Korean Patent Application No. 10-2006-0061937, filed on Jul. 3, 2006, and Korean Patent Application No. 10-2006-0108536, filed on Nov. 3, 2006, in the Korean Intellectual Property Office, the disclosures of which are incorporated herein in their entirety by reference.

BACKGROUND OF THE INVENTION

1. Field of the Invention

The present invention relates to a method of controlling a digital photographing apparatus and a digital photographing apparatus adopting the method, and more particularly, to a method of controlling a digital photographing apparatus capable of producing a clear image and controlling a degree of exposure despite shaking of the digital photographing apparatus during photographing, and a digital photographing apparatus adopting the method.

2. Description of the Related Art

Due to the increasing popularity of digital photographing apparatuses such as digital still cameras and digital video cameras, demand for high quality still pictures and moving pictures is increasing. One solution that has been adopted recently to produce a clearer image despite shaking of a camera due to the shakiness of a user's hand or other external influences while taking a photograph is the use of software to correct the image information after the image has be captured.

However, the software can only correct the image information to a limited extent, since the image information before correction is already inaccurate due to shaking of the digital photographing apparatus when the photograph is taken. Also, due to the shaking of the digital photographing apparatus, the digital photographing apparatus remains in one position for a fairly limited amount of time, and therefore the image information must be captured fairly quickly. Thus, the aperture value, sensitivity and shutter speed cannot be directly controlled by a user to prevent deterioration to the sharpness, brightness and other qualities of a photograph.

SUMMARY OF THE INVENTION

To solve the above and/or other problems, the present invention provides a method of controlling a digital photographing apparatus capable of producing a clearer image and allowing the user to control factors impacting exposure, despite shaking of the digital photographing apparatus during photographing, and a digital photographing apparatus adopting the method.

According to an aspect of the present invention, there is provided a method for controlling a digital photographing apparatus, the method comprising: obtaining first information of a subject for a time $t_1$ at a first sensitivity; obtaining second information of the subject for a time $t_2$ at a second sensitivity that is different from the first sensitivity; and obtaining an image of the subject from the first information and the second information, wherein at least one of the obtaining of the first information and the obtaining of the second information is performed in a state in which a position where an image of the subject is formed on a photographing element included in the photographing apparatus is maintained constant in spite of shakiness of the photographing apparatus.

The first information and the second information may be obtained at the same aperture value. The user may set the first sensitivity, the second sensitivity, or a shutter speed equal to the sum of the time $t_1$ and the time $t_2$ or another value.

The first sensitivity may be higher than the second sensitivity.

The first information may be information regarding the edges of the subject and the second information may be information regarding the color and brightness of the subject.

The second sensitivity may be previously set by a user and the first sensitivity may be automatically set based on the amount of light from the subject.

The second sensitivity may be higher than the first sensitivity.

The first information may be information regarding the color and brightness of the subject and the second information may be information regarding the edges of the subject.

The first sensitivity may be previously set by a user and the second sensitivity may be automatically set based on the amount of light from the subject.

The shutter speed may be previously set by a user and the time $t_1$ may be automatically set considering the amount of light from the subject.

The first information or second information may be obtained from a position where an image of the subject is formed on the photographing element included in the photographing apparatus is maintained constant despite shaking of the photographing apparatus.

Both first and second information may be obtained from a position where an image of the subject is formed on the photographing element included in the photographing apparatus is maintained constant despite shaking of the photographing apparatus.

The maintaining of the position where an image of the subject is formed on the photographing element included in the photographing apparatus constant in spite of shakiness of the photographing apparatus may be achieved by changing a relative position of the photographing element included in the photographing apparatus with respect to the housing of the photographing apparatus.

The relative position change of the photographing element included in the photographing apparatus with respect to the housing of the photographing apparatus may be performed in a direction opposite to a movement of the housing of the photographing apparatus.

The maintaining of the position where an image of the subject is formed on the photographing element included in the photographing apparatus constant in spite of shakiness of the photographing apparatus may be achieved by changing an optical path of light from the subject toward the photographing element included in the photographing apparatus by changing a relative position of a lens included in the photographing apparatus with respect to the housing of the photographing apparatus.

According to another embodiment of the present invention, there is provided a digital photographing apparatus, the apparatus comprising: a shake correction module; and a computer readable medium of instructions, and a CPU for controlling the digital photographing apparatus, wherein a first information and second information about a photographed subject are obtained at a times t1 and t2, wherein at least one of the obtaining of the first information and the obtaining of the second information is performed in a state in which a position where an image of the subject is formed on a photographing element included in the photographing apparatus is maintained constant by use of the shake correction module despite shaking of the photographing apparatus.

The first information and the second information may be obtained at the same aperture value. The user may set the first sensitivity, the second sensitivity, or a shutter speed equal to the sum of the time $t_1$ and the time $t_2$.

The first sensitivity may be higher than the second sensitivity.

The first information may be information regarding the edges of the subject and the second information may be information regarding the color and brightness of the subject.

The second sensitivity may be set by a user prior to photographing and the first sensitivity may be automatically set based on the brightness of the subject.

The second sensitivity may be higher than the first sensitivity.

The first information may be information regarding the color and brightness of the subject and the second information may be information regarding the edges of the subject.

The first sensitivity may be set by a user prior to the photographing and the second sensitivity may be automatically set based on the brightness of the subject.

The shutter speed may be set by a user prior to photographing and the time $t_1$ may be automatically set based on the brightness of the subject.

The first information or the second information may be obtained from a position where an image of the subject is formed on the photographing element included in the photographing apparatus is maintained constant despite shaking of the photographing apparatus.

Both the first information and the second information may be obtained from a position where an image of the subject is formed on the photographing element included in the photographing apparatus is maintained constant despite shaking of the photographing apparatus.

The constant maintaining of the position where an image of the subject is formed on the photographing element included in the photographing apparatus despite shaking of the photographing apparatus may be achieved by the shake correction module changing a relative position of the photographing element included in the photographing apparatus with respect to the housing of the photographing apparatus.

The relative position change of the photographing element included in the photographing apparatus with respect to the housing of the photographing apparatus may be performed in a direction opposite to a movement of the housing of the photographing apparatus due to the shaking.

The constant maintaining of the position where an image of the subject is formed on the photographing element included in the photographing apparatus despite shaking of the photographing apparatus may be achieved by the shake correction module changing an optical path of light from the subject toward the photographing element included in the photographing apparatus by changing a relative position of a lens included in the photographing apparatus with respect to the housing of the photographing apparatus.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
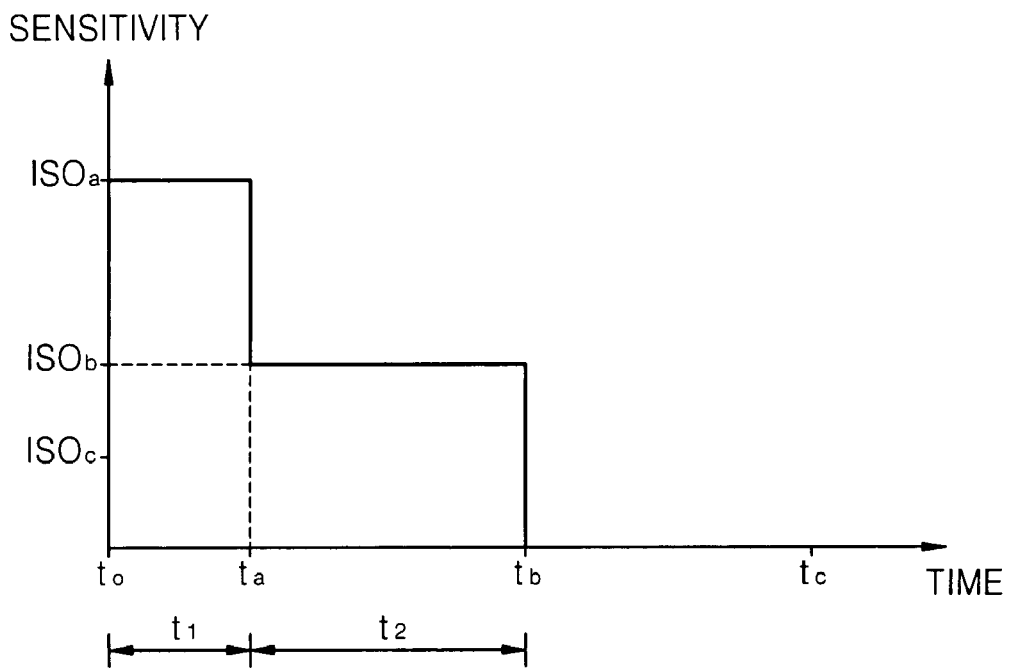
FIG. 1 is a graph showing the relation between time and sensitivity in a method for controlling a digital photographing apparatus according to an embodiment of the present invention.

FIG. 1 is a graph showing the relation between time and sensitivity in a method for controlling a digital photographing apparatus according to an embodiment of the present invention. As shown in FIG. 1, the photographing of a subject according to the method for controlling a digital photographing apparatus according to the present embodiment includes two steps. First, first information of the subject is obtained at a first sensitivity of $ISO_a$ for a time $t_1$ between $t_0$ through $t_a$. Then, second information of the subject is obtained at a second sensitivity of $ISO_b$ for a time $t_2$ between $t_a$ through $t_b$. While the first and second information of the subject are obtained in the time periods of $t_1$ and $t_2$ respectively at the different first and second sensitivities of $ISO_a$ and $ISO_b$, the first information of the subject is obtained at a higher sensitivity during the time period of $t_0$ through $t_a$ than that during the time period of $t_a$ through $t_b$, as shown in FIG. 1. That is, the first sensitivity $ISO_a$ is higher than the second sensitivity $ISO_b$. The operation of a photographing element included in the digital photographing apparatus can be shortly turned off if required between the first information obtaining step and the second information obtaining step.

In general, it is not possible to obtain a clear image at a slow shutter speed when a digital photographing apparatus is shaken. The shutter is one factor that controls the exposure of the photographing element by allowing through the minimum amount of light needed to reach the photographing element in order to obtain image information. When the shutter speed is slow, the time required for the photographing element to be exposed to light increases. Accordingly, when the shutter speed is slow, the time required for the photographing element to be exposed to light increases and therefore the possibility of the digital photographing apparatus shaking during the time the photographing element is exposed to light also increases. Thus, it is difficult to obtain a clear image with a slow shutter speed. However, when the sensitivity of the photographing element is increased, the shutter speed increases because the image information can be sufficiently obtained in a shorter time than when the sensitivity is lower, even though the photographing element is exposed to the same brightness of light. Thus, when the sensitivity of the photographing element is increased, the effect of the shaking of the digital photographing apparatus is reduced so that an image without blur can be obtained. However, when the sensitivity of the photographing element is increased, noise also increases as a side effect and therefore, the quality of an image may deteriorate.

Thus, according to the present embodiment, the first information of the subject is obtained at a higher sensitivity during the time period between $t_0$ through $t_a$ than that during the time period between $t_a$ through $t_b$ and then the second information of the subject is obtained at a lower sensitivity during the time period between $t_a$ through $t_b$. Accordingly, the first information of the subject without blur is obtained during the time period between $t_0$ through $t_a$ and the second information of the subject except the edges of the subject is obtained during the time period between $t_a$ through $t_b$. For example, the first information of the subject may be related to the edges of the subject while the second information of the subject may be related to the color and brightness of the subject. Since the first information of the subject relating to the edges of the subject is obtained using a high sensitivity, the shutter speed is fast so that the image is obtained without blur. The second information of the subject relating to the color and brightness of the subject is obtained using a low sensitivity so that the information is related to a high quality image with less noise. Thus, a final image of the subject can be obtained from the first information related to the edges of the subject and the second information related to the color and brightness of the subject.

In the combining of the second information and the first information, since the second information of the subject is obtained by a long-term exposure at a low sensitivity, the second information of the subject related to the color and brightness of the subject may be inaccurate around the edges of the subject. Thus, for the obtaining of the second information of the subject at a lower sensitivity, there is a need to increase accuracy of the second information of the subject relating to the color and brightness of the subject around the edges of the subject.

For the above purpose, in the method for controlling a digital photographing apparatus according to the present embodiment, the obtaining of the second information of the subject is performed in a state in which the position where the image of the subject is formed on the photographing element included in the photographing apparatus is maintained constant in spite of shaking of the photographing apparatus. When the position where the image of the subject is formed on the photographing element is maintained constant in spite of the shakiness of the photographing apparatus, image information of the subject with less blur can be obtained.

Furthermore, when the obtaining of the second information of the subject is performed in a state in which the position where the image of the subject is formed on the photographing element is maintained constant in spite of shaking of the photographing apparatus, the time for obtaining the second information can be further extended. Since the position where the image of the subject is formed on the photographing element is maintained constant, even when light from the subject is input to the photographing element for a long time, the information on an image without blur can be obtained. Although the time $t_2$ for obtaining the second information in FIG. 1 is the time period of $t_a$ through $t_b$, in FIG. 2 which shows another embodiment of the method for controlling a digital photographing apparatus, the time period is extended longer and is a time period of $t_a$ through $t_c$. According to the control method in the present embodiment, the second information can be obtained using a longer time period. When the second information is related to the color and brightness of the subject as described above, if the second information is obtained for a longer time period, an image of the subject obtained from the first and second information becomes brighter as a result. That is, a much brighter and clearer image can be obtained by the control method used by this embodiment than by a conventional control method.

In general, when a user photographs an image, various effects on an image, such as a change in the depth of field, can be obtained by controlling an aperture value. However, according to the conventional method for controlling a digital photographing apparatus to prevent the deterioration of clarity of an image due to shaking, it is not possible for the user to control the aperture value due to the primary purpose of preventing the deterioration of clearness of an image due to shaking. When the aperture value is increased, the amount of light input to the photographing element is reduced so that a slower shutter speed is required. Accordingly, when using a conventional control method, the possibility that the photographing device will shake during the time a photograph is taken increases and thus the possibility that the image is unclear increases, since the time for taking the photograph increases due to the slower shutter speed.

However, in the method for controlling a digital photographing apparatus according to the present embodiment, the obtaining of the second information of the subject is performed in a state in which the position where the image of the subject is formed on the photographing element is maintained constant despite shaking of the photographing apparatus. Thus, even when the time $t_2$ for obtaining the second information is extended, information on the image of the subject with minimal blur can be obtained. Thus, the user can obtain an image without significant blur and with various effects by freely controlling the aperture value. The obtaining of the first information and the second information can be performed at the same aperture value previously set by the user.

Figure 3:
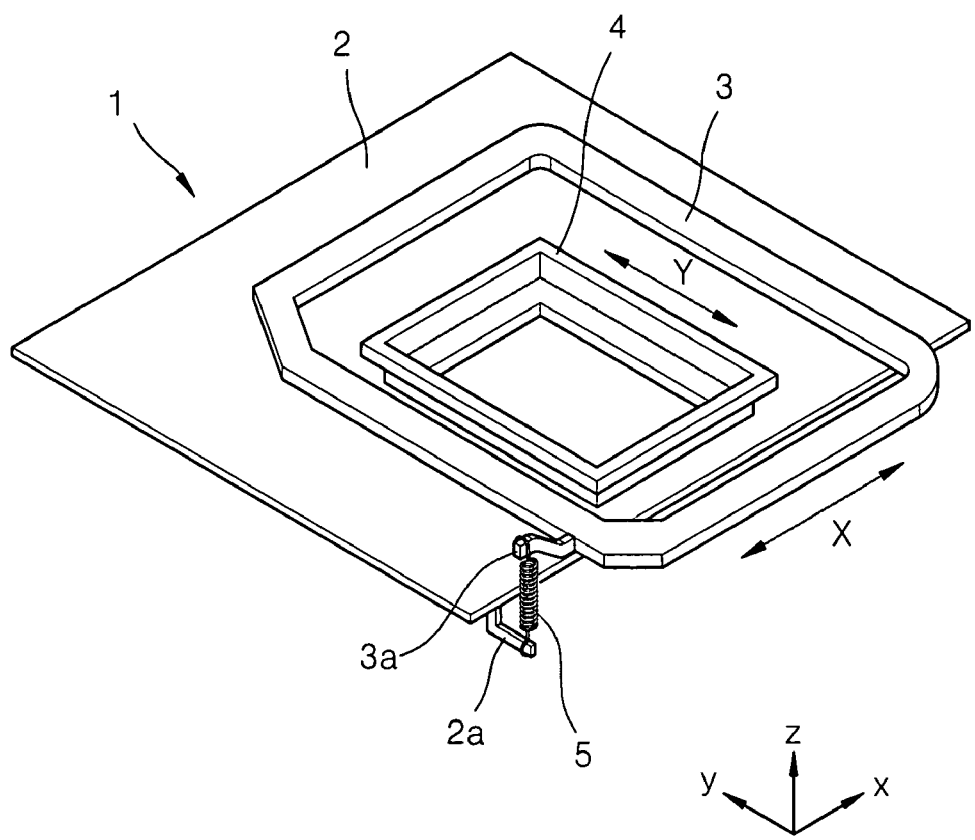
FIG. 3 is a perspective view of a shake correction module maintaining the constant position of an image of a subject in a photographing element provided in the photographing apparatus in spite of shaking of the photographing apparatus in the method for controlling a digital photographing apparatus as shown in FIGS. 1 and 2.

In the obtaining of the second information of the subject, to enable the position where the image of the subject is formed on the photographing element to be maintained constant in spite of shaking of the photographing apparatus by changing a relative position of the photographing element to the housing of the digital photographing apparatus, a shake correction module can be used as shown in the embodiment in FIG. 3.

Figure 2:
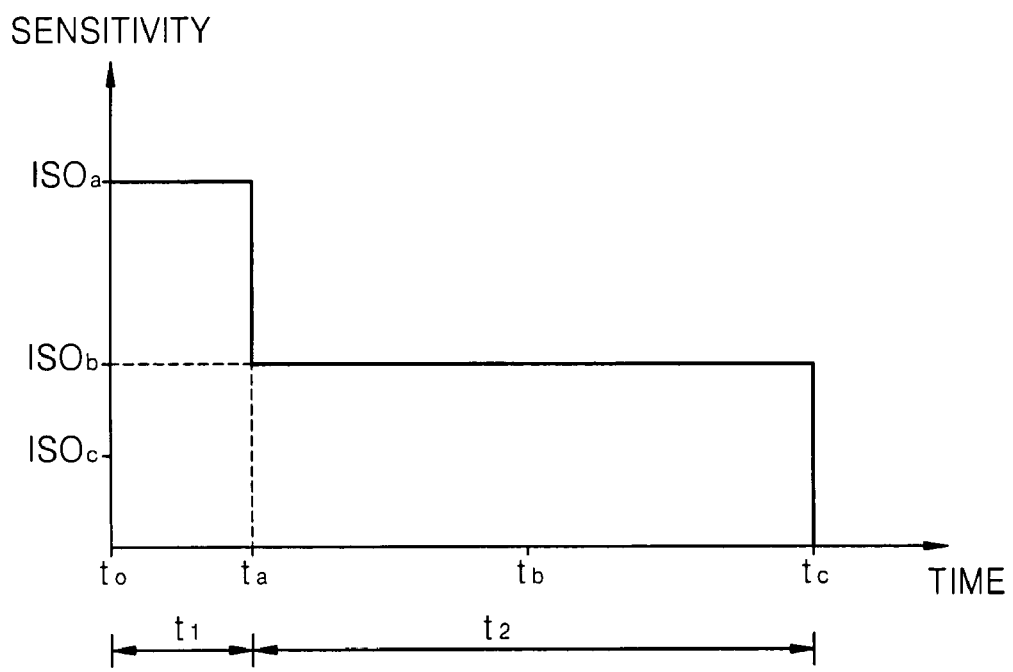
FIG. 2 is a graph showing the relation between time and sensitivity in a method for controlling a digital photographing apparatus according to another embodiment of the present invention.

FIG. 3 is a perspective view of a shake correction module 1 used to maintain the constant position of an image of a subject in a photographing element provided in the photographing apparatus despite shaking of the photographing apparatus in the method for controlling a digital photographing apparatus as shown in FIGS. 1 and 2. Referring to FIG. 3, the shake correction module 1 according to the present embodiment is of a photographing element shift type and includes a base plate 2, a slider 3, and a photographing element base 4. A photographing element (not shown), for example, a CCD (charge coupled device) or a CMOS (complementary metal oxidized semiconductor), is provided in the photographing element base 4.

The photographing element base 4 is installed at the slider 3 and can move in a Y-axis direction with respect to the slider 3. The slider 3 is installed at the base plate 2 and can move in an X-axis direction with respect to the base plate 2. Thus, the photographing element can move in both X-axis and Y-axis directions with respect to the base plate 2. Although it is not shown in FIG. 3, the slider 3 and the photographing element base 4 can be driven in the X-axis and Y-axis directions by an additional driving unit such as a piezo-electric actuator. A spring 5 is installed at a protruding portion 2a of the base plate 2 and a protruding portion 3a of the slider 3, as necessary, to prevent the slider 3 and the photographing element base 4 escaping from the base plate 2 in a Z-axis direction. Other means such as a magnet, for example, can be used instead of the spring 5.

The base plate 2 of the shake correction module 1 shown in FIG. 3 is installed at the digital photographing apparatus and moved together with the housing of the digital photographing apparatus. When the digital photographing apparatus is shaken in the X-axis or Y-axis direction, to correct shaking, the slider 3 or the photographing element base 4 moves in the opposite direction to the direction in which the housing of the apparatus moves due to the shaking. Accordingly, the obtaining of the second information of the subject is performed in a state in which the position where the image of the subject is formed on the photographing element included in the photographing apparatus is maintained constant despite shaking of the photographing apparatus. Also, to detect the shakiness of the digital photographing apparatus, a motion sensing unit such as a gyro sensor can be further provided. Furthermore, a position sensing unit to calculate the amount of movement of a position of the photographing element according to a degree of shaking of the digital photographing apparatus detected by the motion sensing unit can be further provided.

In the digital photographing apparatus control method according to the present embodiment, the obtaining of the second information of the subject on the color and brightness of the subject at a low sensitivity is performed in a state in which the position where the image of the subject is formed on the photographing element included in the photographing apparatus is maintained constant in spite of shaking of the photographing apparatus. Thus, accurate information on the color and brightness of the subject can be obtained even around the edges of the subject. Also, a clear image of the subject can be obtained by combining the second information with the first information which relates to the edges of the subject.

To perform the obtaining of the second information subject in the state in which the position where the image of the subject formed on the photographing element included in the photographing apparatus is maintained constant in spite of shaking of the photographing apparatus, a different method from the above method of using the shake correction module that adjusts the position of the photographing element of the digital photographing apparatus can be used. For example, in an embodiment, the position of the photographing element is fixed to the position of the housing of the digital photographing apparatus and instead an optical path of the light from the subject to the photographing element of the digital photographing apparatus is changed corresponding to the shaking of the digital photographing apparatus so that the position of the image of the subject formed on the photographing element of the digital photographing apparatus can be maintained constant. That is, a lens group having a high sensitivity is moved such that the position of the image of the subject moves in the opposite direction to the direction in which the digital apparatus is shaken because of the change in direction of the optical path of the light from the subject. Thus, the position of the image of the subject formed on the photographing element of the digital photographing apparatus can be maintained constant.

The factors that the user can control are not limited to the aperture value. The user can control many factors, including, but not limited to, the first sensitivity, the second sensitivity, and the shutter speed. Among other values, the shutter speed can be manually set to a time equal to the sum of the time $t_1$ for obtaining the first information and the time $t_2$ for obtaining the second information. For example, as described above and shown in FIGS. 1 and 2, the brightness of an image can be controlled by a user by manually setting the time $t_2$ for obtaining the second information. That is, by enabling the user to preset the shutter speed and the automatic setting of the time $t_1$ considering the brightness of light from the subject, the user can control the time $t_2$ for obtaining the second information. Since digital photographing apparatuses generally set the exposure time automatically based on the brightness of a photographed subject, the automatic setting of the time $t_1$ based on the brightness of a photographed subject can be achieved through a method commonly used in conventional digital photographing apparatuses.

Figure 4:
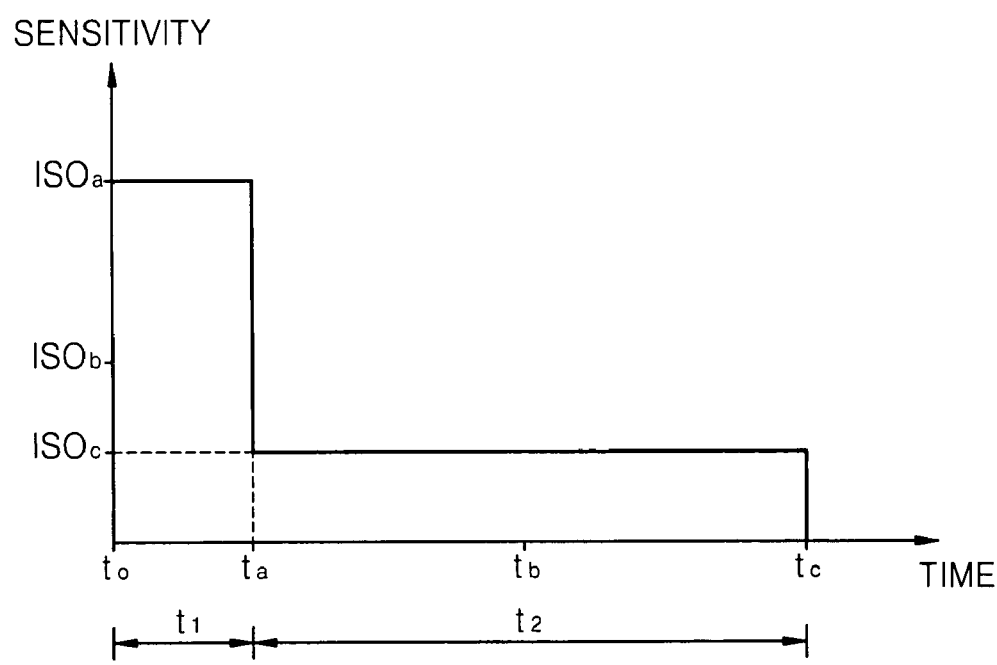
FIG. 4 is a graph showing the relation between time and sensitivity in a method for controlling a digital photographing apparatus according to another embodiment of the present invention.
Figure 5:
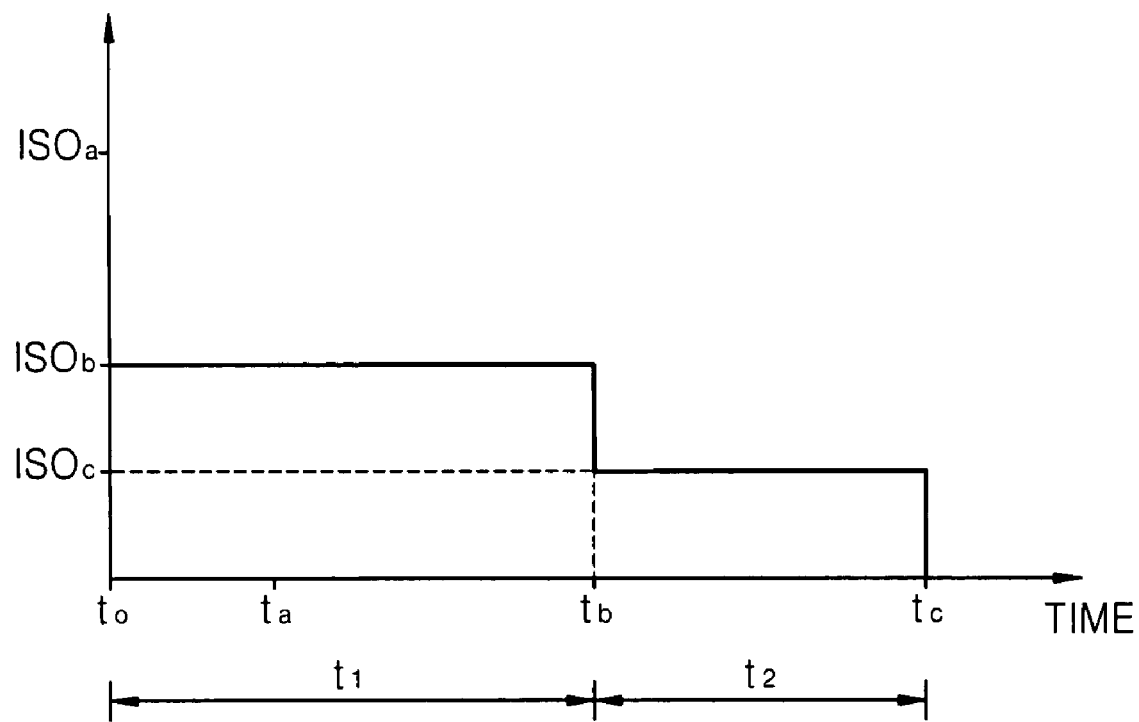
FIG. 5 is a graph showing the relation between time and sensitivity in a method for controlling a digital photographing apparatus according to yet another embodiment of the present invention.

In addition to the aperture value or shutter speed, the user can also control the sensitivity. For example, although in FIG. 1 the sensitivity of the photographing element during the time period for obtaining the second information is $ISO_b$, the sensitivity can be lowered to $ISO_c$ as shown in FIG. 4. As the sensitivity is lowered, as can be seen in FIGS. 1 and 4, the time $t_2$ ($=t_c-t_a$) needed for obtaining the second information is further extended. However, since the position where the image of the subject is formed on the photographing element included in the photographing apparatus is maintained constant in spite of shaking of the photographing apparatus during the time for obtaining the second information, even when the time for obtaining the second information is further extended, the second information relating to an image without blur can be obtained in spite of the shaking of the digital photographing apparatus. Since the second information can be obtained at a lower second sensitivity $ISO_c$ as shown in FIG. 4, second information of a high quality image with low noise can be obtained. The user can intentionally obtain an image with a coarse feeling due to noise included therein by increasing the second sensitivity. Also, in this case, the first sensitivity can be automatically set considering the brightness of light from the subject. For this purpose, an automatic sensitivity setting function of a general automatic digital photographing apparatus can be used. If needed, the user can control the first sensitivity for the time $t_1$ for obtaining the first information as shown in another embodiment shown in FIG. 5.

In the method for controlling a digital photographing apparatus according to the present embodiment, the obtaining of the second information regarding the color and brightness of the subject at a low sensitivity is performed in a state in which the position where the image of the subject is formed on the photographing element included in the photographing apparatus is maintained constant in spite of shaking of the photographing apparatus. Thus, accurate information on the color and brightness of the subject can be obtained even around the edges of the subject. Also, a clear image of the subject can be obtained by combining the second information to the first information of the subject which relates to the edges of the subject. Also, in an embodiment, since the user can set any one of a number of elements prior to taking a photograph, the elements including, but not limited to, the shutter speed, the first sensitivity, the second sensitivity, and the aperture value, the user can obtain an image having a customized effect.

In some cases, for example, when the color of subjects or of the background subject are similar or photographing is performed in a black and white mode, the information on the edges of the subject may be more important than the information on the color or brightness of the subject. In this case, the obtaining of the first information subject regarding the edges of the subject is performed in a state in which the position where the image of the subject is formed on the photographing element included in the photographing apparatus is maintained constant in spite of shaking of the photographing apparatus.

In an embodiment, a decision on which one of the obtaining of the first information of the subject on the edges of the subject and the obtaining of the second information of the subject on the color and brightness of the subject should be performed in a state in which the position where the image of the subject is formed on the photographing element included in the photographing apparatus is maintained constant in spite of shaking of the photographing apparatus, can be made by the digital photographing apparatus by automatically analyzing the information on the color and the brightness of the subject. In another embodiment, the same decision can be made by a user and various modifications thereof are available. In some cases, both of the obtaining of the first information subject regarding the edges of the subject and the obtaining of the second information subject regarding the color and brightness of the subject can be performed in a state in which the position where the image of the subject is formed on the photographing element included in the photographing apparatus is maintained constant in spite of shaking of the photographing apparatus. Thus, in such an embodiment, since the user can set any one of a number of elements prior to taking a photograph, the elements including, but not limited to, the shutter speed, the first sensitivity, the second sensitivity, and the aperture value, the user can obtain an image having a customized effect.

In the above-described embodiments, a case of obtaining the second information at the second sensitivity which is lower than the first sensitivity after the first information is obtained at the first sensitivity that is a higher sensitivity during photographing is described, but the present invention is not limited thereto. That is, after the first information is obtained at the first sensitivity that is a lower sensitivity, the second information can be obtained at the second sensitivity that is the same as or higher than the first sensitivity. In this case, the first information obtained at the first sensitivity that is a lower sensitivity may be information on the color and brightness of the subject while the second information obtained at the second sensitivity that is a higher sensitivity may be information regarding the edges of the subject. That is, although, in the control method according to the above-described embodiments, the information on the edges of the subject is first obtained at a higher sensitivity and then the information on the color and brightness of the subject is obtained at a lower sensitivity, various modifications thereof are available, for example, the information on the color and brightness of the subject can first be obtained at a lower sensitivity and then the information regarding the edges of the subject is obtained at a higher sensitivity. In this case, the first sensitivity can be set by the user prior to the photographing so that the user can obtain the information on the color and brightness in consideration of noise. In this case, the second sensitivity is automatically set considering the brightness of light from the subject so that the information on the edges of the subject without blur can be obtained.

Figure 6:
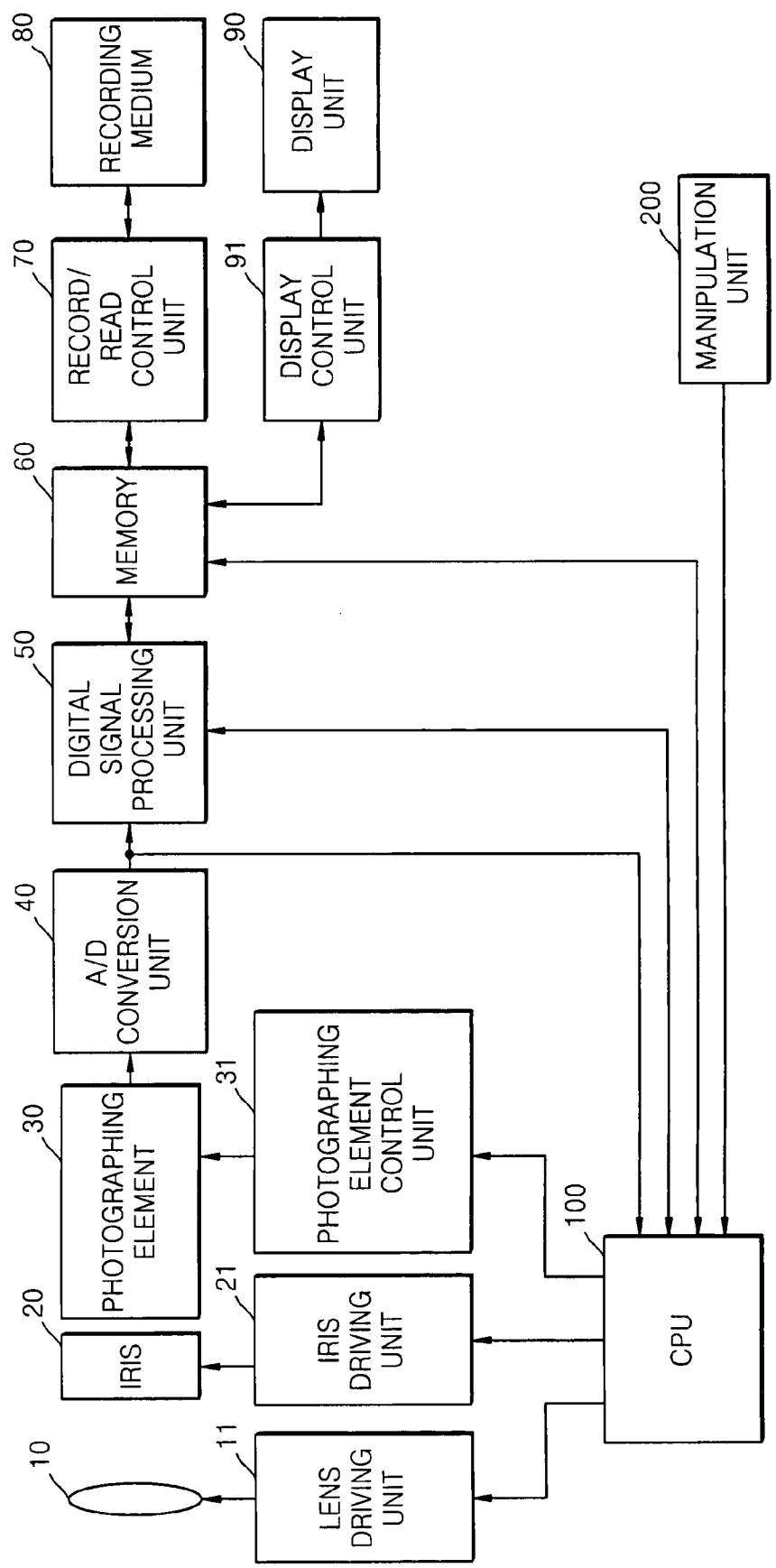
FIG. 6 is a block diagram illustrating a digital photographing apparatus according to an embodiment of the present invention.

FIG. 6 is a block diagram illustrating a digital photographing apparatus according to an embodiment of the present invention.

In the embodiment of FIG. 6, the operation of the digital photographing apparatus is controlled by a CPU 100. A manipulation unit 200, including a key generating an electrical signal from a user, is included in the digital photographing apparatus. An electrical signal from the manipulation unit 200 is transferred to the CPU 100 such that the CPU 100 can control the digital photographing apparatus according to the electrical signal.

In photographing mode, if an electrical signal from the user is transferred to the CPU 100, the CPU 100 identifies the signal and controls a lens driving unit 11, an iris driving unit 21, and a photographing element control unit 31. According to this control, the position of a lens 10, opening of the iris 20, and sensitivity of a photographing element 30 are controlled for autofocusing. Further, although not shown in FIG. 6, the digital photographing apparatus may be provided with a shake correction module and a shake correction module control unit to maintain the constant position of an image of a subject in the photographing element 30 in spite of shaking of the digital photographing apparatus. If a data signal of an image is output from the photographing element 30, the signal is converted into digital image data by an analog-to-digital (A/D) conversion unit 40, and input to the CPU 100 and a digital signal processing unit 50. The digital signal processing unit 50 performs digital signal processing, such as gamma correction and white balance adjustment.

The image data output from the digital signal processing unit 50 is transferred through a memory 60 or directly to a display control unit 91. Here, the memory 60 includes a read-only memory (ROM) or a random-access memory (RAM). The display control unit 91 controls a display unit 90 and displays an image on the display unit 90. The image data output from the digital signal processing unit 50 can be input to a recording/reading control unit 70 through the memory 60. The recording/reading control unit 70 records the image data on a recording medium 80 automatically or according to a command from the user. Also, the recording/reading control unit 70 can read image data of an image file stored in the recording medium 80, and input the read image data to the display control unit 91 so that the image can be displayed on the display unit 90.

A program for executing the control method of the digital photographing apparatus according to the embodiments and variations of present invention can be stored in a recording medium.

The recording medium storing the control method of the digital photographing apparatus may be the recording medium 80 or the memory 60 as illustrated in FIG. 6, or may also be a separate recording medium. Examples of the recording medium include magnetic storage medium (for example, read-only memory (ROM), and hard disks) and optical data storage devices (for example, CD-ROM, digital versatile disc (DVD)). Also, the CPU 100 illustrated in FIG. 6 or part of the CPU 100 may be employed as the recording medium.

As described above, according to the method for controlling a digital photographing apparatus according to the present invention and a digital photographing apparatus adopting the method, a clear image can be obtained and a degree of exposure can be controlled in spite of shaking of the digital photographing apparatus.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for controlling a digital photographing apparatus, the method comprising:

obtaining first information of a subject for a first duration at a first sensitivity;

obtaining second information of the subject for a second duration at a second sensitivity that is different from the first sensitivity;

compensating for shaking of the digital photographing apparatus during at least one of the first duration and the second duration; and obtaining an image of the subject from the first information and the second information, wherein the obtaining of the first information and the obtaining of the second information is performed at the same aperture value, and at least one of the first sensitivity, the second sensitivity, and a shutter speed that is the sum of the first duration and the second duration is set by a user prior to a photographing operation.

2. The method of claim 1, wherein the first sensitivity is greater than the second sensitivity.

3. The method of claim 2, wherein the first information is edge information of the subject, and the second information is color and/or bright information of the subject.

4. The method of claim 2, wherein the second sensitivity is set by a user prior to the photographing and the first sensitivity is automatically set considering the brightness of the subject.

5. The method of claim 1, wherein the second sensitivity is higher than the first sensitivity.

6. The method of claim 5, wherein the first information is color and/or brightness information of the subject, and the second information is edge information of the subject.

7. The method of claim 5, wherein the first sensitivity is set by a user prior to the photographing and the second sensitivity is automatically set considering the brightness of the subject.

8. The method of claim 1, wherein the shutter speed is set by a user prior to the photographing and the first duration is automatically set considering the brightness of the subject.

9. The method of claim 1, wherein the compensating step is performed during the first duration.

10. The method of claim 1, wherein the compensating step is performed during the second duration.

11. The method of claim 1, wherein the compensating step is performed during both the first duration and the second duration.

12. The method of claim 1, wherein the compensating step is to constantly maintain the position where an image of the subject is formed on a photographing element included in the photographing apparatus in spite of the shaking of the photographing apparatus, by changing a relative position of the photographing element with respect to a case of the photographing apparatus.

13. The method of claim 12, wherein the relative position change of the photographing element with respect to the case is performed in a direction opposite to a movement of the case of the photographing apparatus due to the shaking.

14. The method of claim 1, wherein the compensating step is to constantly maintain the position where an image of the subject is formed on a photographing element included in the photographing apparatus in spite of the shaking of the photographing apparatus, by changing an optical path of light from the subject toward the photographing element by changing a relative position of a lens included in the photographing apparatus with respect to a case of the photographing apparatus.

15. A digital photographing apparatus comprising:
a photographing element that receives a light reflected from a subject and converts the light to image data; and
a CPU that communicates with the photographing element,
wherein the CPU controls the photographing element to obtain first information of a subject for a first duration at a first sensitivity, obtain second information of the subject for a second duration at a second sensitivity that is different from the first sensitivity, compensate for shaking of the digital photographing apparatus during at least one of the first duration and the second duration, and obtain an image of the subject from the first information and the second information, and
the obtaining of the first information and the obtaining of the second information is performed at the same aperture value, and at least one of the first sensitivity, the second sensitivity, and a shutter speed that is the sum of the first duration and the second duration is set by a user prior to a photographing operation.

16. The apparatus of claim 15, wherein the first sensitivity is greater than the second sensitivity.

17. The apparatus of claim 16, wherein the first information is edge information of the subject, and the second information is color and/or bright information of the subject.

18. The apparatus of claim 16, wherein the second sensitivity is set by a user prior to the photographing and the first sensitivity is automatically set considering the brightness of the subject.

19. The apparatus of claim 15, wherein the second sensitivity is greater than the first sensitivity.

20. The apparatus of claim 19, wherein the first information is color and/or bright information of the subject and the second information is edge information of the subject.

21. The apparatus of claim 19, wherein the first sensitivity is set by a user prior to the photographing and the second sensitivity is automatically set considering the brightness of the subject.

22. The apparatus of claim 15, wherein the shutter speed is set by a user prior to the photographing and the first duration is automatically set considering the brightness of the subject.

23. The apparatus of claim 15, wherein the obtaining of the first information is performed in a state in which the position where an image of the subject is formed on the photographing element is maintained constant in spite of the shaking of the photographing apparatus.

24. The apparatus of claim 15, wherein the obtaining of the second information is performed in a state in which the position where an image of the subject is formed on the photographing element is maintained constant in spite of the shaking of the photographing apparatus.

25. The apparatus of claim 15, wherein both of the obtaining of the first information and the obtaining of the second information are performed in a state in which the position where an image of the subject is formed on the photographing element included in the photographing apparatus is maintained constant in spite of the shaking of the photographing apparatus.

26. The apparatus of claim 15 further comprising a shake correction module, the shake correction module constantly maintaining the position where an image of the subject is formed on the photographing element in spite of the shaking of the photographing apparatus to compensate for shaking of the digital photographing apparatus in communication with the CPU, by changing a relative position of the photographing element with respect to a case of the photographing apparatus.

27. The apparatus of claim 26, wherein the relative position change of the photographing element with respect to the case of the photographing apparatus is performed in a direction opposite to a movement of the case of the photographing apparatus due to the shaking.

28. The apparatus of claim 15 further comprising a shake correction module, the shake correction module constantly maintaining the position where an image of the subject is formed on the photographing element in spite of the shaking of the photographing apparatus to compensate for shaking of the digital photographing apparatus in communication with the CPU, by changing an optical path of light from the subject toward the photographing element by changing a relative position of a lens included in the photographing apparatus with respect to a case of the photographing apparatus.

* * * * *